(12) United States Patent
Pajel et al.

(10) Patent No.: US 10,717,257 B2
(45) Date of Patent: Jul. 21, 2020

(54) LIGHT-CURABLE SEALANT APPLICATOR

(71) Applicant: The Boeing Company, Chicago, IL (US)

(72) Inventors: Carissa A Pajel, Mercer Island, WA (US); Benjamin P Hargrave, Bellevue, WA (US); Hugh C VanValkenburgh, Issaquah, WA (US); Darrin Hansen, Seattle, WA (US); Kay Y Blohowiak, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 199 days.

(21) Appl. No.: 15/702,098

(22) Filed: Sep. 12, 2017

(65) Prior Publication Data

US 2019/0077140 A1 Mar. 14, 2019

(51) Int. Cl.
| | | |
|---|---|---|
| *B32B 37/12* | (2006.01) | |
| *B05B 1/28* | (2006.01) | |
| *B05D 3/06* | (2006.01) | |
| *B05D 1/26* | (2006.01) | |
| *B05B 1/00* | (2006.01) | |
| *B05C 17/005* | (2006.01) | |
| *B05C 17/01* | (2006.01) | |
| *F26B 25/06* | (2006.01) | |

(52) U.S. Cl.
CPC .......... *B32B 37/1284* (2013.01); *B05B 1/005* (2013.01); *B05B 1/28* (2013.01); *B05C 17/005* (2013.01); *B05C 17/00503* (2013.01); *B05C 17/00596* (2013.01); *B05C 17/01* (2013.01); *B05D 1/26* (2013.01); *B05D 3/062* (2013.01); *B05D 3/067* (2013.01); *F26B 25/066* (2013.01)

(58) Field of Classification Search
CPC ........ B32B 37/1284; B05D 3/062–064; B05D 3/067
See application file for complete search history.

(56) References Cited

U.S. PATENT DOCUMENTS

| | | | | |
|---|---|---|---|---|
| 4,262,847 A | * | 4/1981 | Stitzer | B05B 7/1209 239/112 |
| 6,207,238 B1 | * | 3/2001 | Affinito | B05D 1/62 427/398.1 |
| 2009/0092764 A1 | * | 4/2009 | Hoeckelman | B05B 7/228 427/508 |
| 2011/0146570 A1 | * | 6/2011 | Bradley | B05C 9/14 118/641 |
| 2015/0139714 A1 | * | 5/2015 | Jurcevic | B29C 35/0805 401/195 |
| 2016/0158791 A1 | * | 6/2016 | Offermann | G03F 7/16 118/100 |
| 2016/0368005 A1 | * | 12/2016 | Pajel | B05C 9/12 |

* cited by examiner

*Primary Examiner* — J C Jacyna
(74) *Attorney, Agent, or Firm* — Coats & Bennett, PLLC (57) ABSTRACT

Methods, systems and apparatuses are disclosed for at least partially curing a light-curable material within a dispenser to obtain an at least partially-cured material and dispensing the at least partially-cured material to a substrate, while retaining substantially all of the light within the dispenser.

20 Claims, 9 Drawing Sheets

FIG. 13    FIG. 14

LIGHT-CURABLE SEALANT APPLICATOR

TECHNOLOGICAL FIELD

The present disclosure relates generally to the field of sealants and dispensing sealants. More specifically, the present disclosure relates to dispensing curable sealants where the sealant curing is initiated prior to dispensing such sealants, and dispensers for dispensing such sealants.

BACKGROUND

Sealants are often applied at the interface of substrate surfaces to achieve a seal at such interfaces that is durable and often impervious to fluid leaks. Many sealants will cure under ambient conditions if given enough time. However, since curing time can become a limiting factor on a production line, accelerated curing times for sealants are desirable. Sealants have been developed comprising curing agents that react chemically with a curing initiator, or curing initiating event, to accelerate the curing rate of applied sealants. Sealants comprising resins have been developed that use an external energy source (e.g., radiation, including ultraviolet (UV) light) to trigger or otherwise initiate curing of such sealant materials. Unfortunately, when manual application of sealants is required, especially in a confined space, an operator may risk exposure to hazardous amounts of UV-light required to initiate cure of applied sealants.

SUMMARY

Aspects of the present disclosure are directed to methods, systems and apparatuses for dispensing a light-curable sealant from a dispenser wherein the dispenser comprises an internal light source for initiating the curing of the light-curable material to form an at least partially-cured material within the dispenser while retaining or containing substantially all of the light within the dispenser. In another aspect, the light source is a UV light source.

A further aspect of the present disclosure is directed to a dispenser comprising a housing, a reservoir contained within the housing, with the reservoir dimensioned to contain a predetermined amount of light-curable material, and a nozzle in communication with the reservoir. The nozzle comprises an inner nozzle wall and an outer nozzle wall, a proximate nozzle end and a distal nozzle end, with the proximate nozzle end in communication with the reservoir and the inner nozzle wall defining a nozzle pathway. The nozzle pathway comprises a static mixing section, with the static mixing section comprising static mixing elements. The dispenser further comprises a light source configured to emit light, with the light source positioned within the housing and further positioned proximate to at least a portion of the outer nozzle wall within the housing and at a predetermined distance from the distal nozzle end.

In another aspect, the light source is a UV light source, the housing is opaque to UV light, and the nozzle is made from a material comprising a UV light transmission value ranging from about 80 to about 99%.

In another aspect, an amount of an at least partially light-cured material is directed to a substrate from a dispenser, with the dispenser comprising a housing and a reservoir contained within the housing, with the reservoir dimensioned to contain a predetermined amount of light-curable material, and a nozzle in communication with the reservoir. The nozzle comprises an inner nozzle wall and an outer nozzle wall, a nozzle proximate nozzle end and a distal nozzle end, with the proximate nozzle end in communication with the reservoir and the nozzle inner wall together with the static mixing section defining a nozzle pathway. The nozzle pathway comprises a static mixing section, with the static mixing section comprising static mixing elements. The dispenser further comprises a light source configured to emit light, with the light source positioned within the housing and further positioned proximate to a portion of the outer nozzle wall within the housing and at a predetermined distance from the distal nozzle end, and wherein the light emitted from the light source is substantially contained within the housing.

Another aspect is directed to a method for dispensing a partially-cured material comprising initiating a light source, with the light source housed within a dispenser, and with the dispenser comprising a nozzle, and with the nozzle comprising an inner nozzle wall, an outer nozzle wall, a proximate nozzle end and a distal nozzle end. The light source is positioned within the dispenser and proximate to a section of the outer nozzle wall and also positioned a predetermined distance from the distal nozzle end. The inner nozzle wall defines a nozzle pathway. The nozzle pathway comprises a static mixing section, with the static mixing section comprising static mixing elements. The light source is positioned within the dispenser and proximate to a section of the outer nozzle wall and at a predetermined distance from the distal nozzle end, wherein light from the light source is substantially contained within the dispenser. A flow of light-curable material is directed through the nozzle pathway and light-curable material is exposed to the light to form an at least partially-cured material. The partially-cured material is then dispensed from the dispenser.

In another aspect, the light-curable material is a UV-curable material and the light source is a UV light source.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale, and wherein:

DETAILED DESCRIPTION

Aspects of the present disclosure are directed to a light-curable material, including without limitation, a UV-curable material, especially for use as sealant, and initiating cure of the light-curable material in a dispenser by emitting light and directing the light to the light-curable material completely within the predetermined regions of the dispenser. According to aspects of the disclosure, the light source is positioned within the dispenser, (e.g., within a recess in the dispenser) and configured to provide the light required to trigger or initiate curing of the light-curable material to achieve an at least partially-cured material while the material resides within the dispenser prior to, or substantially commensurate with, the release of the material that is at least partially-cured from the dispenser. Further and importantly, the light used to at least partially cure the material being dispensed is substantially retained or substantially contained within the dispenser.

The light used to at least partially cure the material being dispensed from the dispensers of the present disclosure is understood to be light having a wavelength over a wide spectrum including light having a wavelength from about 10 nm to about 750 nm. Within this range exists light known as ultraviolet, or UV light having a wavelength ranging from about 10 nm to about 400 nm. To achieve the at least partial curing of light-curable material, including light-curable sealant material contemplated as having particular use with the presently disclosed dispensers, light having a wavelength ranging from about 280 nm to about 700 nm is particularly contemplated. Therefore, while the present disclosure specifically refers to UV light used to at least partially cure UV-curable materials dispensed by the disclosed dispensers, it should be understood that aspects of the present disclosure contemplate other light sources (e.g., blue light sources, etc.) emitting light at the wavelength or wavelengths required to trigger (e.g., initiate) curing, and at least partially cure material being dispensed by the disclosed dispensers. That is, mention in this disclosure of UV light provided from UV light sources used to trigger (e.g. initiate), and at least partially cure material dispensed by the disclosed dispensers, is stated without limitation intended, and by way of example.

According to one aspect, a UV light source is oriented within a dispenser and configured to direct UV light to at least a predetermined portion that may be, for example, a limited portion of a nozzle through which a UV-curable material flows. Such careful directing of the UV light from the UV light source ensures that only predetermined portions of the nozzle and the nozzle pathway, and UV-curable material passing through the UV-irradiated portions of the nozzle pathway, are UV-irradiated in a predetermined fashion and/or according to a predetermined protocol. In this way, the supply of UV-curable material in the dispenser is not prematurely triggered for cure (e.g., the UV-curable material supply awaiting introduction into the nozzle remains uncured until it ready to have curing initiated, achieve a state of at least partial cure, and is dispensed from the dispenser).

Figure 1:
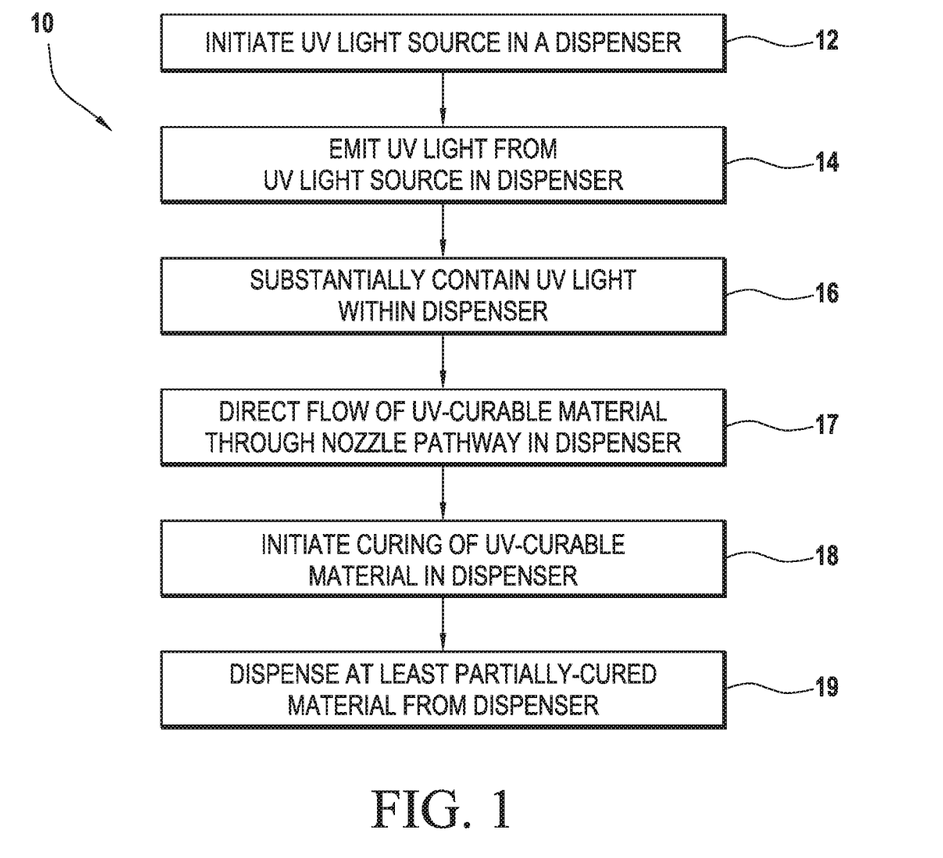
FIG. 1 is a flowchart pertaining to an aspect of the present disclosure.
Figure 2:
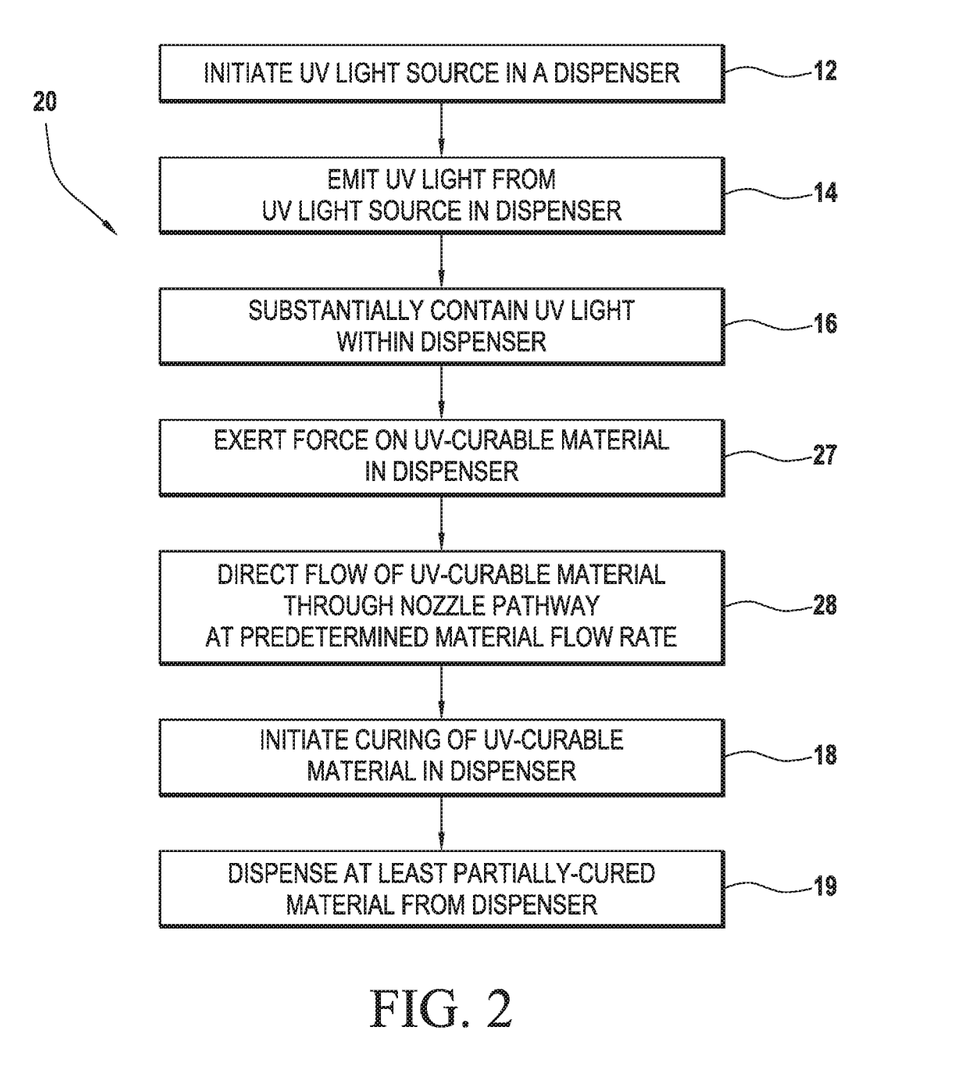
FIG. 2 is a flowchart pertaining to an aspect of the present disclosure.
Figure 3:
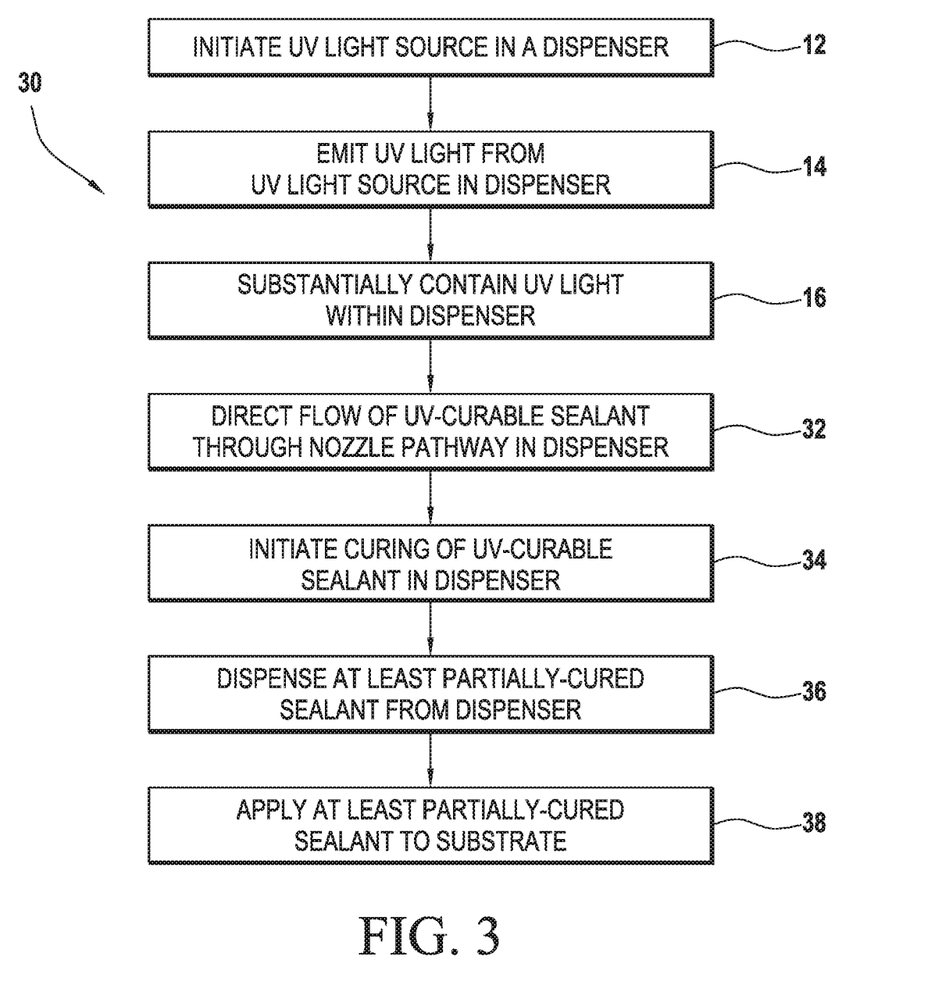
FIG. 3 is a flowchart pertaining to an aspect of the present disclosure.

FIGS. 1, 2 and 3 are flowcharts outlining contemplated methods of dispensing at least partially-cured material (FIGS. 1 and 2) and sealant (FIG. 3) from dispensers of the type disclosed herein. Such methods are more fully described below.

Figure 4:
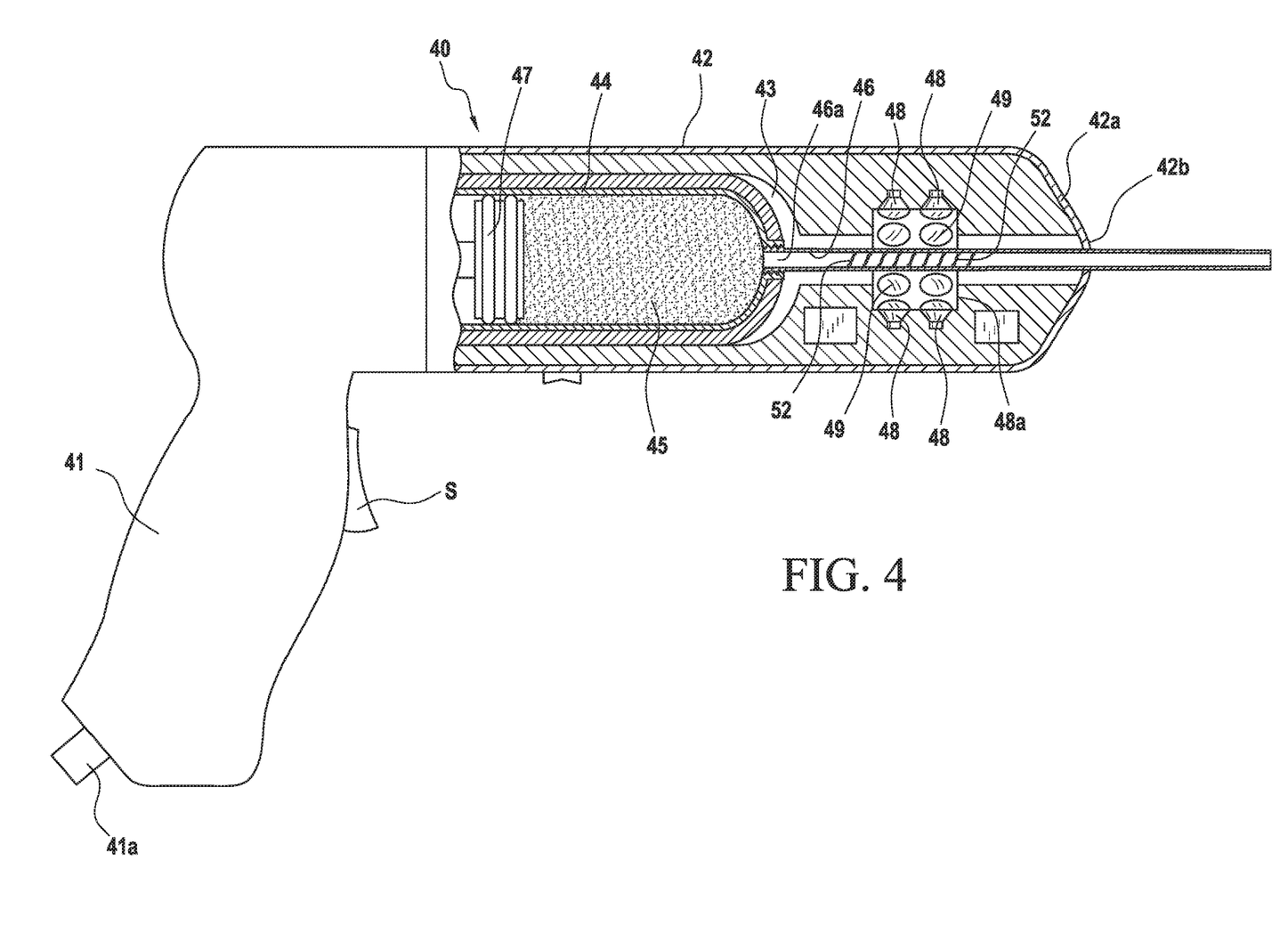
FIG. 4 is a partial cross-sectional side view of a dispenser according to aspects of the present disclosure.

FIG. 4 shows further aspects of the present disclosure. As shown in FIG. 4, a dispenser 40 includes a handle 41 and a housing 42 attached to the handle 41. Contained within the housing is a recess 43 configured and dimensioned to hold a reservoir 44. As shown in FIG. 4, reservoir 44 contains a light-curable material 45. A nozzle 46 is shown in communication with reservoir 44, such that, when a plunger 47 is activated, pressure (e.g., pressure generated by exerting a mechanical, pneumatic or other suitable force, etc.) is applied to the light-curable material 45 in reservoir 44, predetermined amounts of light-curable material 45 will be pushed from the reservoir 44 and into nozzle pathway 46a of nozzle 46. Static mixing elements 52 (shown in greater detail in FIG. 5) are shown positioned within nozzle 46. A plurality of light sources 48 are shown positioned within recess 48a and are positioned proximate to and adjacent the nozzle 46. A lens array 49 is shown positioned proximate to the light sources 48. Lens array 49 is positioned and configured to attenuate and direct the light emitted from the light sources 48. As further shown in FIG. 4, the nozzle 46 is shown protruding through a gasket 42b disposed at the distal end 42a of housing 42. A power cord 41a is shown in communication with handle 41. Activating switch "S" is depressed to complete an electrical circuit (not shown) that activates dispenser 40.

Figure 8:
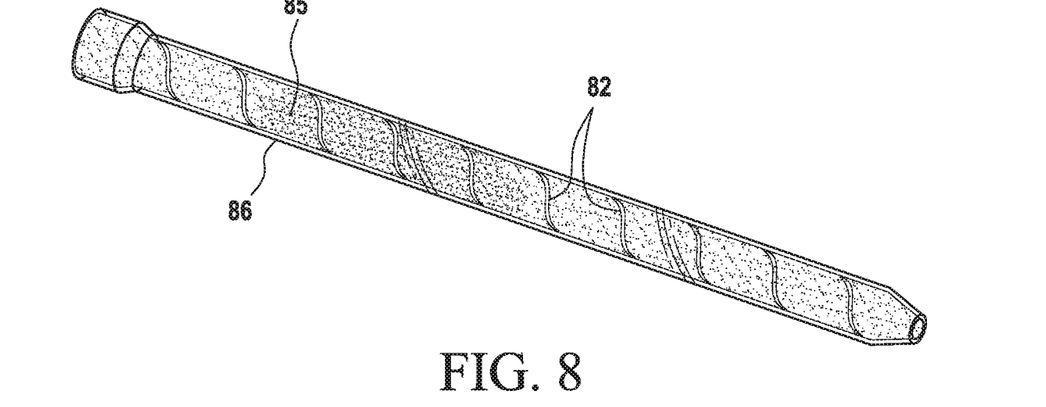
FIG. 8 is a perspective view showing an aspect of the resent disclosure.

The nozzle 46 may be integral with reservoir 44, or may be a discrete element configured to engage securely with a fixed reservoir. While FIG. 4, shows a reservoir 44 comprising an amount of light-curable material 45, according to further aspects, when light-curable material is contained within a pre-loaded nozzle (e.g., in the form of a pre-loaded cartridge, such as shown in FIG. 8 herein), the reservoir may not contain light-curable material, but instead may contain an amount of air or gas that is compressed against the nozzle 46 by activating plunger 47. Such pre-loaded nozzle cartridges may be removable, and may be refillable or disposable.

Although not shown in FIG. 4, the dispenser may be in communication with a supply source of light-curable material, such as a light-curable sealant supply source (e.g. via a light-curable feed line into the dispenser reservoir and/or nozzle from a light-curable material supply) that is located externally from the dispenser, such as, for example, in a tank. The light-curable material may then be directed, for example, under pressure or vacuum from the supply source to the dispenser in a continuous, discontinuous, or as-needed basis (e.g., on-demand).

According to further aspects, the dispenser as shown in FIG. 4, is used to at least partially cure UV-curable material within the dispenser by emitting UV light from UV light sources to trigger (e.g., initiate) curing in the UV-curable material and form at least partially-cured material in the nozzle pathway of the nozzle. According to further aspects, the UV-curable material is a UV-curable sealant material generally, or a UV-curable aircraft sealant material specifically.

When using UV-light for curing UV-curable materials, housings of the disclosed dispensers are made from any material impervious to UV light so that the housing made from such material will substantially retain and/or contain within the dispenser, the UV light released from the UV light sources. According to the present disclosure, the term "substantially retain and/or contain within the dispenser" means retaining and/or containing within the dispenser up to about 100% of the light emitted by the light sources. Contemplated materials used to make or coat the housing include, without limitation, treated and untreated rubber, fiber-containing material, metal, treated plastic, etc., and are limited only by weight, cost or other considerations, so long as UV light cannot pass through the material. Further, a base material that is not itself impervious to UV light, but that is rendered impervious to UV light upon treatment with additives, or coating or coatings with a further material is also contemplated. Such housing material coatings include, without limitation, silicone, neoprene, polyurethane, fluoroelastomers, and ethylene propylene diene monomer.

UV-curable materials that are contemplated according to aspects of the present disclosure include, without limitation, one-part compositions comprising at least one of a polysulfide, a polythioether, a polyurethane, an epoxy, an acrylate or a polyimide. According to further aspects, some of the contemplated UV-curable materials comprise a viscosity value ranging from about 450 Poise to about 21,000 Poise. Still further aspects contemplate the selected UV-curable materials having a predetermined UV-curable material flow rate through the nozzle ranging from about 5 grams/minute to about 200 grams/minute (g/min.). Further, when pressure is applied to the material, the pressure applied to the UV-curable and the at least partially-cured material ranges from about 15 psi to about 150 psi. While such UV-curable materials do not ordinarily require mixing to achieve a final cure, such materials do require being exposed to a certain amount of UV light for a predetermined duration to initiate the desired curing. Such duration is known as "dwell time" and is discussed below in more detail.

Useful materials for nozzles as contemplated according to aspects of the present disclosure include high density polytetrafluoroethylene, polyvinylidene, clear polyvinyl chloride, polypropylene, glass, acrylic, polycarbonate and transparent acrylonitrile butadiene styrene. Preferred nozzle materials include, glass, acrylics, high density polytetrafluoroethylene, polycarbonate, and other materials that are, or can be made to be, transparent or translucent and that have a UV light transmissivity ranging from about 80% to about 99%.

The dispensers according to aspects of the present disclosure are understood to be able to be powered by AC or DC electrical power and may be operated manually and may be sized to be handheld. The dispensers may also be operated automatically, including remotely. In addition, the dispenser may also be incorporated into, or retrofitted to, existing equipment (e.g., sealant application equipment) including larger equipment that may be operated manually or automatically as well as wirelessly, and may comprise electronics including sensors and receivers responsive to, for example, computer-assisted activation, for example signaling controllers, with the controllers in communication with a computer comprising appropriate software.

Figure 5:
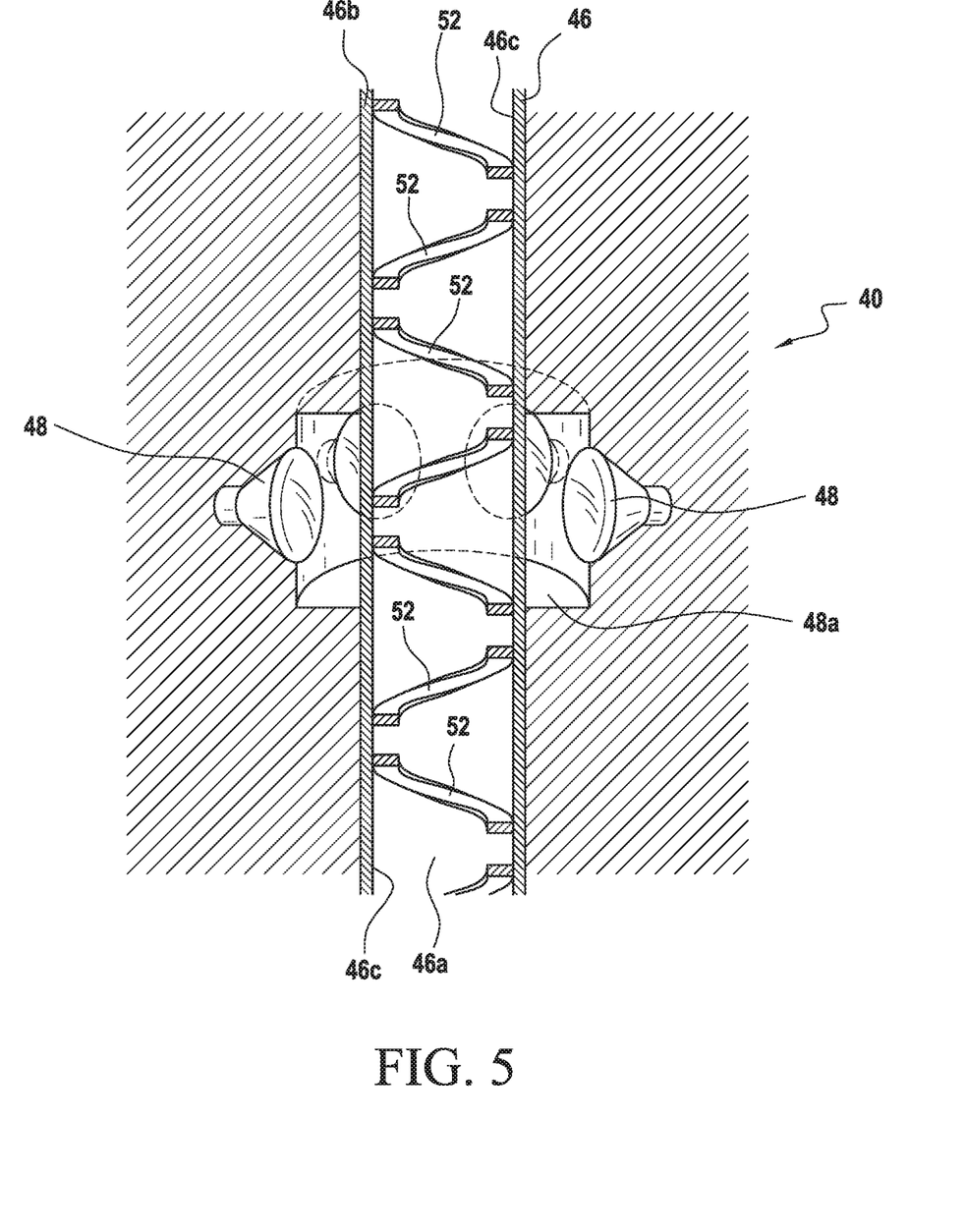
FIG. 5 is a perspective view showing an aspect of the resent disclosure.

FIG. 5 is an enlarged view of a section of dispenser 40 showing a section of the nozzle 46 similar to that shown in FIG. 4, except that the UV light sources 48 are positioned differently and the lens array is absent for illustrative purposes. As shown in FIG. 5, nozzle 46 includes the nozzle pathway 46a defined by the nozzle inner wall 46c of nozzle wall 46b. Nozzle pathway 46a, as shown in FIG. 5, includes static mixing elements 52 positioned in nozzle pathway 46a.

As shown in FIG. 5, the static mixing elements 52 are positioned fixedly in nozzle pathway 46a. However, though not shown in FIG. 5, the static mixing elements 52 may be positioned in the nozzle pathway in a non-fixed orientation (e.g., a moveable orientation relative to the inner nozzle wall, if desired). Static mixing elements 52 are preferably made from a material that is transparent or translucent and otherwise highly transmissive to UV light, and condition the flow of UV-curable material that proceeds through nozzle pathway 46a when dispenser 40 is activated. A plurality of UV-light sources 48 are shown positioned within UV light recess 48a proximate to and adjacent the nozzle 46. The nozzle wall 46b is made from a material that is transparent or translucent or otherwise has a high transmissivity relative to UV-light, such that UV light emitted from UV light sources 48 passes through the nozzle wall 46b and is directed to UV-curable material passing through the nozzle pathway 46a.

According to an aspect of the present disclosure, as UV-curable material is directed at a predetermined UV-curable material flow rate (e.g., ranging from about 5 g/min. to about 200 g/min.) under a predetermined pressure (e.g., ranging from about 15 psi to about 150 psi) from the reservoir into and through the nozzle, the UV light sources are activated to initiate the at least partial cure of the UV-curable material that is directed into and through the nozzle pathway 46a of the nozzle 46. As the UV-curable material passes the UV light sources and is exposed to the UV light passing through the nozzle wall 46b and into the nozzle pathway 46a, at least portions of the UV-curable material become at least partially-cured.

As shown in FIG. 5 and elsewhere in the FIGs., the static mixing elements present in the nozzle pathway impact, and otherwise influence in a predetermined fashion, the flow of the UV-curable material passing through the nozzle pathway. The static mixing elements incorporated into the nozzles of the dispensers according to the present disclosure are selected in concert with the selected nozzle dimension (e.g., length, width), the selected light source and light source intensity as well as the type of light-curable material selected. The mixing action imparted by the static mixing elements on the light-curable material flowing through the nozzle pathway of the nozzle is tailored to achieve the desired degree of at least partial cure of the light-curable material. The static mixing elements, in concert with the flow velocity of the light-curable material and the nozzle and nozzle pathway dimensions, contribute to a desired dwell period during which the light-curable material is exposed to a predetermined amount of light, and is at least partially cured within the dispenser and prior to the exit of the at least partially-cured material from the dispenser. FIGS. 7 and 10-12 further illustrate the effect and impact of the static mixing elements on the dwell period of the material flowing through the nozzle pathway of the nozzle.

Figure 6A:
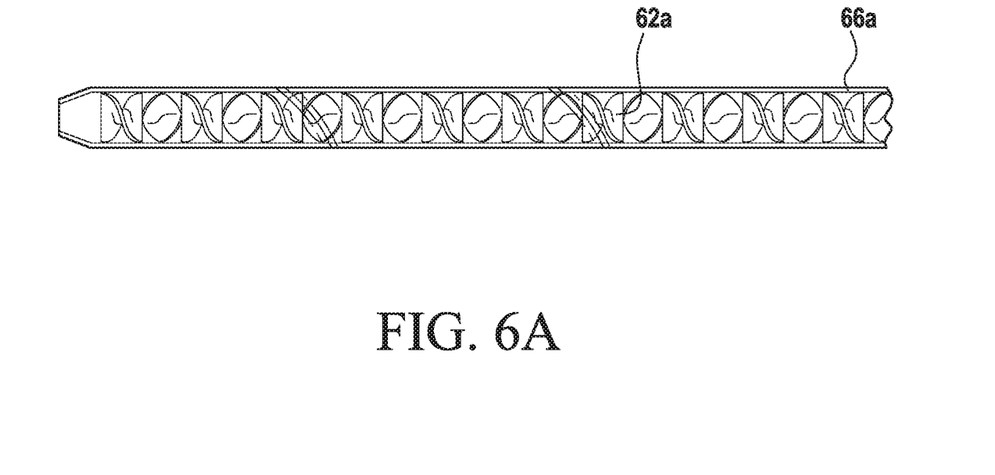
FIGS. 6A and 6B are perspective partial cross-sectional side views showing aspects of the resent disclosure.
Figure 6B:
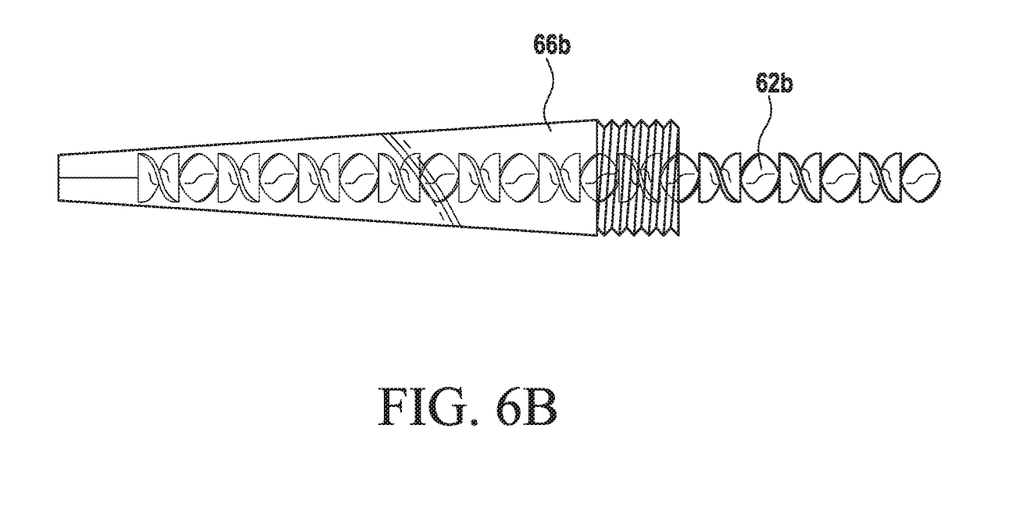

FIGS. 6A and 6B are cross-sectional side views of nozzles contemplated by aspects of the present disclosure. As shown in FIG. 6A, nozzle 60a comprises static mixing elements 62a positioned fixedly in nozzle pathway of nozzle 66a. The static mixing elements 62a may be integral with nozzle 66a such that the nozzle 66a is "pre-loaded" with the static mixing elements, for example, in the form of a cartridge. In another alternative, as shown in FIG. 6B, the static mixing elements 62b may be an insert that is added to the nozzle 66b during the manufacture of the dispenser. The static mixing elements are made from a material that is highly transmissive to UV light, (e.g., having a UV transmissivity rate ranging from about 80% to 99%). Such materials include, without limitation, glass, clear plastic (e.g., acrylic-containing materials, polycarbonate-containing materials, etc.). Such UV-transmissive static mixing elements enable the UV light to be distributed efficiently throughout the UV-curable material as the material passes through the nozzle pathway and, after cure initiation of the UV-curable material has commenced, is then discharged from the dispenser as at least partially-cured material and, for example, applied to a substrate part or joint on a substrate.

Figure 7:
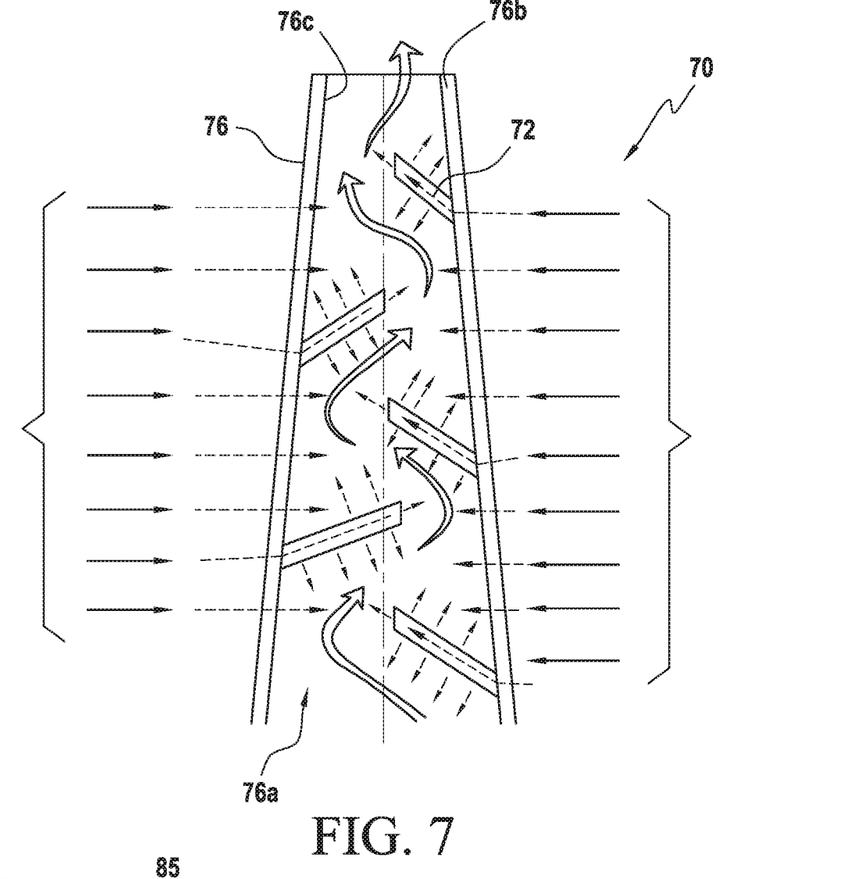
FIG. 7 is a perspective cross-sectional view showing an aspect of the resent disclosure.

FIG. 7 is an enlarged cross-sectional view of another contemplated nozzle assembly 70. As shown in FIG. 7, the nozzle 76 comprises static mixing elements 72 that are shown as being integral with the nozzle inner wall 76c of nozzle wall 76b of nozzle 76. The "curved arrows" show the flow path that is taken by a UV-curable material that is at least partially-cured and is directed through nozzle pathway 76a of nozzle 76. The "horizontal/lateral arrows" represent UV-light emitted from UV light sources (not shown), with the UV light directed through the nozzle wall 76b, and into nozzle pathway 76a.

FIG. 8 shows a view of a nozzle 86 comprising static mixing elements 82 with an amount of UV-curable material 85 resent in the nozzle 86. If desired, the nozzle 86 as shown in FIG. 8, may be a part of a cartridge that is pre-loaded with UV-curable material, or the nozzle itself may represent the entirety of a pre-loaded cartridge.

As shown in FIGS. 5, 6A, and 8, the nozzle wall may have a substantially constant inner diameter along a majority of its length. As shown in FIGS. 6B and 7, the nozzle may be tapered such that the inner diameter of the nozzle is not substantially constant along the majority of its length (as shown in FIGS. 6B and 7). According to aspects of the present disclosure, the selection of nozzle length, diameter and the presence of any predetermined taper is selected in conjunction with other variable and features designed into the overall dispenser, including, without limitation, the size and number of UV light sources, the intensity of the UV-light emitted from the selected UV light sources, the number of and dimension of the static mixing elements, and the composition of the UV-curable material, in combination with dimension and number of static mixing elements as well as the composition of the material used to make the nozzle and the static mixing elements, as well as the pressure applied to, and the viscosity and flow rate of the UV-curable material and at least partially-cured material directed through the nozzle. Regarding UV light intensity, according to aspects of the present disclosure, a preselected UV-intensity comprises an irradiance ranging from about 0.0001 W/m$^2$ to about 1 W/m$^2$.

Properties, including UV-curable material flow rate, viscosity, dwell period within the nozzle, UV curing rate, and amount of UV curing initiated at the interface of the nozzle inner wall are taken into consideration and tailored to arrive at a desired and predetermined level of at least partial curing of the UV-curable material that is directed through a nozzle, out of the dispenser, and is deposited or otherwise applied to an end use (e.g., applied to a substrate surface or joint, etc.).

Dwell period is understood to be the amount of time a UV-curable material resides within the nozzle and is exposed to UV light. The dwell period is therefore influenced and otherwise impacted by the variables listed above and, according to aspects of the present disclosure, is tailored in conjunction with other features, including, for example, the physical features of the static mixing elements present in the nozzle pathway of the nozzle. Such static mixing element features include, without limitation, the number, dimension, geometric and spatial orientation of the mixing elements, as well as the materials selected to fabricate the mixing elements, etc.

The dwell time for initiating UV curing in the contemplated UV-curable materials (e.g., polysulfides, polythioethers, polyurethanes, an epoxies, acrylates and polyimides) is controlled within the dispenser by a number of variables, including, for example, the static mixing element orientation, dimension, quantity of the elements as well as the dimension of the nozzle (e.g., nozzle length and nozzle diameter). Aspects of the present disclosure further contemplate coating or otherwise physically or chemically treating, for example, the nozzle inner wall surface and/or the surfaces of the mixing elements to provide a predetermined friction coefficient (e.g., to impart a predetermined amount of drag or lack of drag), to assist in obtaining a predetermined dwell period for the selected UV-curable material within the nozzle of the dispenser. It is understood that the coating or treatment of the nozzle inner wall surfaces and mixing elements, according to further aspects, should not adversely impact the UV-transmissivity of the nozzle inner wall and/or the mixing elements.

Figure 9:
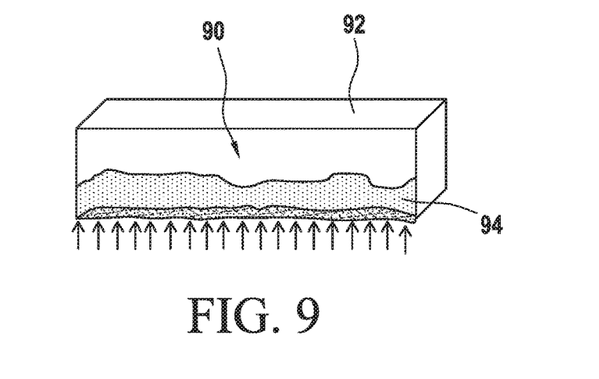
FIG. 9 is a perspective view showing an aspect of the resent disclosure.

In another non-limiting example, FIG. 9 shows the curing effect of UV-light on a UV-curable material according to aspects of the present disclosure. The vertical "arrows" represent UV-light emitted from a UV-light source (not shown) and directed to a sample 90 of UV-curable material filling a container 92 that is transparent to UV-light. The shaded area 94 represents at least partially-cured material where the UV-curing has been initiated in the UV-curable material.

Figures 10, 11:
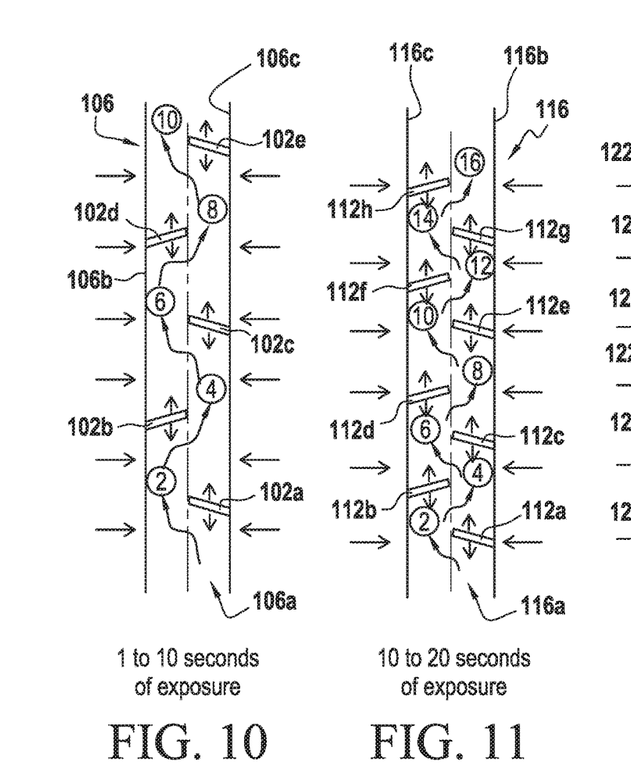
FIGS. 10, 11 and 12 are perspective cross-sectional side views of the nozzle pathway according to aspects of the present disclosure.
Figure 12:
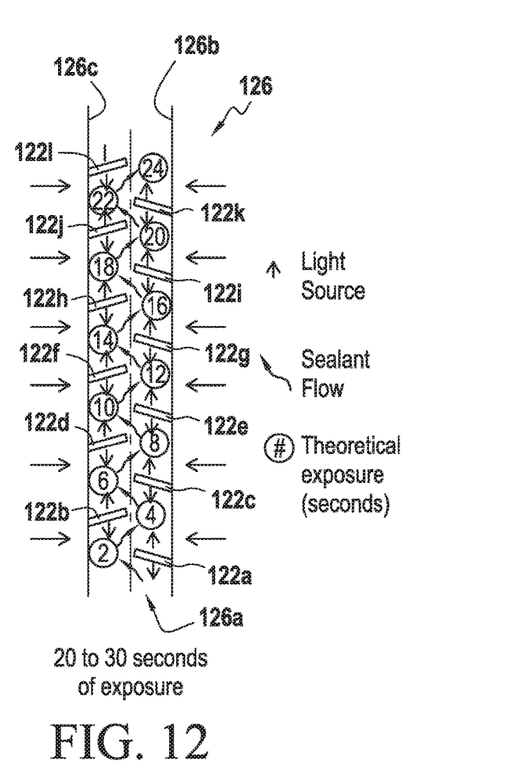

By way of non-limiting examples, FIGS. 10, 11 and 12 illustrate cross-sectional representations of nozzles comprising static mixing elements, and show the relationship between the static mixing elements and how UV-curable flow rate and dwell period are influenced according to aspects of the present disclosure. As shown in FIG. 10, nozzle 106 comprises five (5) static mixing elements 102a-102e that are shown as being integral with or in a fixed position against the nozzle inner wall 106c. As shown, nozzle inner wall 106c, together with the surfaces of the static mixing elements 102a-e, define the nozzle pathway 106a. Horizontal "arrows" represent UV light that is emitted from UV light sources (not shown) and that passes through the nozzle wall 106b of nozzle 106. The "bent arrows" represent the UV-curable material flow through the nozzle pathway 106a. As the UV-curable material encounters the first static mixing element 102a, the UV-curable material is directed in a direction "around" and/or past the static mixing element 102a, and onward to static mixing elements 102b, 102c, 102d, and 102e. The vertical "arrows" at the static mixing elements illustrate UV light passing through the static mixing elements.

The numbers in the "circles" represent a dwell period (in seconds) and the amount of time sustained by the UV-curable material in the nozzle, and, as shown in FIG. 10, the amount of time the UV-curable material is exposed to UV light. For the example shown in FIG. 10, the multiple and non-limiting variables including, for example, composition of UV-curable material, UV light intensity, flow rate, viscosity, system pressure, dimension of the nozzle and nozzle pathway, and the number, orientation, geometry and composition of the static mixing elements were all adjusted and tailored, for example, to achieve a predetermined dwell time of 10 seconds for the UV-curable material in the nozzle pathway (representing the time necessary to achieve a predetermined amount of at least partial UV-curing of the UV-curable material to form an at least partially-cured material).

As shown in FIG. 11, nozzle 116 comprises eight (8) static mixing elements 112a-112h that are shown as being integral with or in a fixed position against the nozzle inner wall 116c. As shown, nozzle inner wall 116c, together with the surfaces of the static mixing elements 112a-112h, define the nozzle pathway 116a. Horizontal "arrows" represent UV light that is emitted from UV light sources (not shown) and that passes through the nozzle wall 116b of nozzle 116. The "bent arrows" represent the UV-curable material flow through the nozzle pathway 116a. As the UV-curable material encounters the first static mixing element 112a, the UV-curable material is directed in a direction "around", and/or past the static mixing element 112a, and onto static mixing elements 112b-112h. As in FIG. 10, the vertical "arrows" at the static mixing elements illustrate UV light passing through the static mixing elements.

As shown in FIG. 11, the amount of time the UV-curable material is exposed to UV-light, as indicated by the circled numbers, is 16 seconds. Therefore, for the example shown in FIG. 11, the multiple non-limiting variables including, composition of UV-curable material, UV-light intensity, flow rate, viscosity, system pressure, dimension of the nozzle and nozzle pathway, and the number, orientation and geometry and composition of the static mixing elements were all adjusted and tailored to achieve a predetermined dwell time of 16 seconds for the UV-curable material in the nozzle pathway (representing the time necessary to achieve a predetermined amount of at least partial UV-curing of the UV-curable material to form an at least partially-cured material).

As shown in FIG. 12, nozzle 126 comprises twelve (12) static mixing elements 122a-112l that are shown as being integral with the nozzle inner wall 126c. As shown, nozzle inner wall 126c together with the surfaces of the static mixing elements 122a-122l, define the nozzle pathway 126a. Horizontal "arrows" represent UV light that is emitted from UV light sources (not shown) and that passes through the nozzle wall 126b of nozzle 126. The "bent arrows" represent the UV-curable material flow through the nozzle pathway 126a. As the UV-curable material encounters the first static mixing element 122a, the UV-curable material is directed in a direction "around", and/or past the static mixing element 122a, and onto static mixing elements 122b-122l. As in FIGS. 10 and 11, the vertical "arrows" at the static mixing elements illustrate UV light passing through the static mixing elements.

As shown in FIG. 12, the amount of time the UV-curable material is exposed to UV-light, as indicated by the circled numbers, is 24 seconds. Therefore, for the example shown in FIG. 11, the multiple variables including, composition of UV-curable material, UV-light intensity, flow rate, viscosity, system pressure, dimension of the nozzle and nozzle pathway, and the number, orientation and geometry and composition of the static mixing elements were all adjusted and tailored to achieve a predetermined dwell time of 24 seconds for the UV-curable material in the nozzle pathway (representing the time necessary to achieve a predetermined amount of at least partial UV-curing of the UV-curable material to form an at least partially-cured material).

As shown in FIGS. 10, 11, 12 and elsewhere herein, the arrangement of the nozzle and static mixing elements causes the activated (e.g., UV cure-initiated) portions of the UV-curable material in the nozzle pathway to be homogenized with amounts of the non-activated UV-curable material in the nozzle pathway before predetermined amounts of at least partially-cured material exit the dispenser and are applied, for example, to a predetermined location on a substrate (e.g., a joint to be sealed, etc.). According to aspects of the present disclosure, the activated and at least partially-cured material exiting the dispenser has a significantly increased degree of homogeneity, relative to the curing that would otherwise occur, take place throughout and across the volume of the material in the nozzle without the presence of the static mixing elements. The homogeneity of the UV cure-initiated material that is induced by aspects of the present disclosure produces a more thoroughly activated and at least partially-cured final product applied to a substrate by the dispenser. In addition, the "blending action", or mixing of the UV-curable material with the at least partially-cured material flowing through the dispenser via the nozzle pathway increases the thoroughness of the UV light source UV activation (e.g., cure initiation) of the UV-curable material as the UV-curable material that is exposed to the UV light source becomes intertwined (e.g., through the action of the material flowing past the static mixing elements) with the amount of UV-curable material in the nozzle pathway that has yet to be exposed to the UV light. In this way, according to aspects of the present disclosure, the homogenization of the UV-curable material flowing through the nozzle is significantly impacted by the placement and design of the transparent or translucent static mixing elements incorporated with or used in conjunction with the predetermined dimensions of the nozzle of the dispenser.

According to further non-limiting aspects, if a light-curable material requires a known dwell time, nozzles having features as shown in FIGS. 10, 11 or 12 can be selected and matched to a desired light-curable material and used in the dispenser. In other words, if a light-curable material requires a dwell period of from about 1 to about 10 seconds, the length of a nozzle can be short, and/or can comprise fewer static mixing elements in the nozzle pathway (e.g., the nozzle shown in FIG. 10). When greater dwell time is required to initiate cure of a light-curable material, nozzles with a greater diameter and/or length, and/or nozzles having a greater number of static mixing features is used with the dispenser. (See, e.g., the nozzles shown in FIGS. 11 and 12). As a result, according to non-limiting aspects of the present disclosure, a light source exposure time can be tailored in a predetermined fashion based on the formulation curing requirements of the light-curable material, while still maintaining a predetermined material flow and flow rate through the nozzle pathway of the dispenser, thus maximizing processing productivity relative to at least partially-cured material dispensed, for example, in a manufacturing process and/or assembly line, etc.

Therefore, according to aspects of the present disclosure where UV light is contemplated, to achieve a desired rate of curing for a reasonable and predetermined dwell period, the mixing of a UV-curable material in the nozzles, according to aspects of the present disclosure, is agitated or otherwise "mixed" by the flowing material traversing the static mixing elements as the UV-curable material proceeds through the nozzle pathway. The predetermined mixing characteristics of the static mixing elements enables the portions of the UV-curable material that are activated first (e.g., the material in which curing has been initiated) and likely to occur at or near the inner nozzle wall, to be mixed with non-activated UV-curable material in the nozzle pathway. For example, the tumbling and turbulence of the UV-curable material and at least partially-cured material caused, at least in part, by the static mixing elements, at least serves to present a substantially continuous and predetermined agitated flow of uncured UV-curable material toward the nozzle inner wall for curing initiation. Further, the UV-curable material in which curing has been initiated by the UV-light (e.g., the at least partially-cured material) is directed away from the nozzle inner wall and into contact with portions of UV-curable material for which curing has not been initiated.

Through this mixing action, dwell time of the UV-curable material within the nozzle is tailored in a predetermined way, and the curing initiation of the UV-curable material is conducted in a more homogeneous fashion, compared to a process that does not include such mixing of the UV-curable material with at least partially-cured material within the nozzle.

Without being bound to any particular theory, the number and design of the static mixing elements may produce a degree of backpressure on the system within the dispenser that can predictably serve to slow the flow and lower the flow rate of UV-curable material through the nozzle, and can cause or contribute to a predetermined residence time or dwell time of the material within the nozzle. This dwell time allows the UV-curable material the time required to be exposed to the amount of UV light required to initiate UV curing. Therefore, according to aspects of the present disclosure, a number of variables are tailored to achieve the desired dwell time. Such variables include, without limitation, number, dimension, geometry, orientation and composition of static mixing elements, length of nozzle, area of nozzle exposed to UV light within the dispenser, diameter of the nozzle, internal surface area of the nozzle, intensity of the UV light source, location and positioning of the UV light source, length and positioning of the UV light source array, etc.

Some aspects of the present disclosure, illustrated and described in non-limiting fashion, contemplate a removable, replaceable, disposable etc. nozzle that can protrude from the distal end of the dispenser. In some instances the nozzle may be integral with the reservoir, and the combined reservoir/nozzle assembly may be removable, and/or replaceable, and in such instances is referred to as a cartridge. The distal end, or "tip" of the housing of the dispenser allows the nozzle distal end of the cartridge to emerge from or protrude from the distal housing end. When the dispenser comprises a UV light source, aspects of the present disclosure further contemplate that the "fit" of the nozzle distal end that emerges from the housing distal end allows substantially no UV light to emerge from the housing distal end of the housing or from the dispensers.

Figure 13:
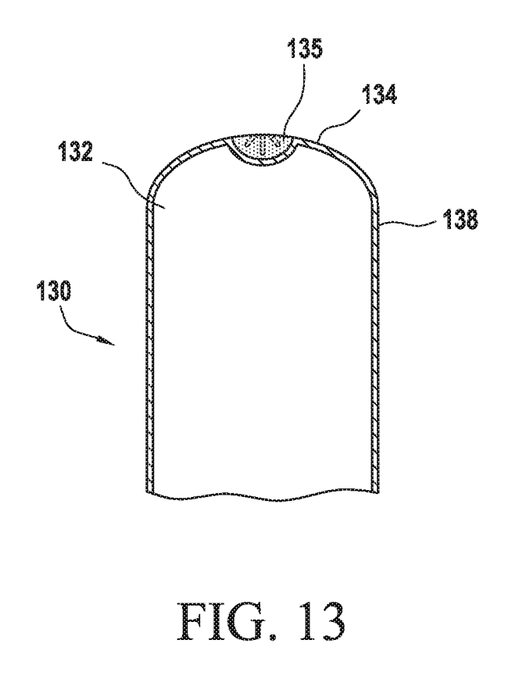
FIGS. 13 and 14 show cross-sectional side views of a distal housing end according to aspects of the present disclosure.
Figure 14:
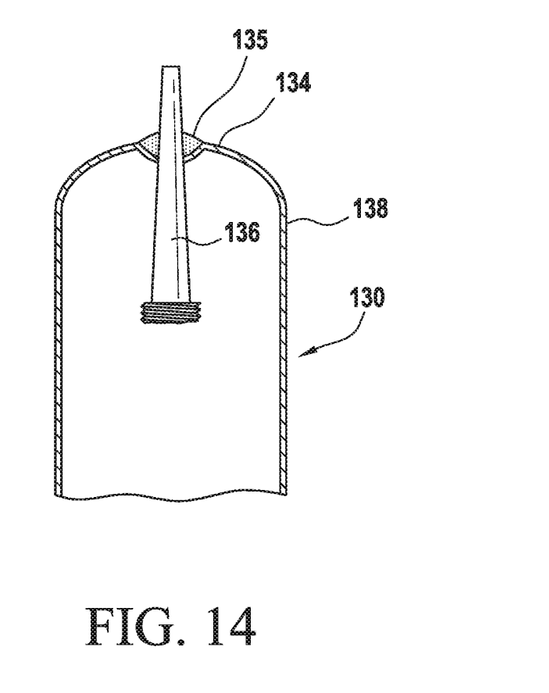

In addition, FIGS. 13 and 14 show a partial cross-sectional view of a housing 132 of a dispenser 130. According to the aspects shown in FIGS. 13 and 14, the distal housing end 134 of housing 132 comprises a gasket 135 that is physically penetrable to, for example, a distal end of a nozzle 136 (as shown in FIG. 14). When UV light is emitted from UV light sources (e.g., as shown in FIGS. 4 and 5) for the purpose of initiating curing of a UV-curable material, the UV light is substantially contained and otherwise retained within the dispenser. To facilitate and otherwise ensure the containment of substantially all of the UV light within the dispenser and the dispenser housing, gasket 135 comprises a material that is opaque relative to the through-passage of UV light. For the purposes of the present disclosure, the term "substantially all of the UV light" means up to about 100% of the UV light emitted from the UV light sources. Such gasket material may be made from a rubber or dyed silicone-containing or other flexible and resilient material that is able to form a penetrable seal that may be friction-fitting seal between the housing distal end and the nozzle distal end passing through the housing/gasket. Further aspects contemplate obviating the need for the gasket 135 if the fit between the nozzle and the housing, and the materials selected to make the nozzle and housing ensure a substantially complete retention and/or containment of light within the dispenser without the presence of the gasket 135.

Further, if desired, the entire housing may comprise a housing outer layer 138 that is selected for any number of desired properties including, without limitation, tack, ergonomics, resilience, shock absorption, etc. Further, the housing outer layer 138 may itself provide the housing 132 of the dispenser with the required imperviousness of UV light and therefore ensure against the escape from the dispenser of any UV light. According to further aspects, the gasket 135 may be integral with the housing outer layer 138, and the gasket 135 may be made from a material that is similar to or dissimilar from the material used to make the housing outer layer 138.

FIGS. 1-3 are flowcharts outlining methods according to aspects of the present disclosure, including the aspects described in FIGS. 4-14. According to aspects of the present disclosure, FIG. 1 shows a method 10 for dispensing UV-curable material from a dispenser such as that shown in FIG. 4 and elsewhere herein, the method comprising the steps of 12 initiating UV light from a UV light source with the light source positioned within a dispenser, followed by 14 emitting UV light from the UV light source within the dispenser, and 16 substantially containing the UV light within the dispenser. The method further comprises 17 directing a flow of UV-curable material through a nozzle pathway of a nozzle in the dispenser and 18 initiating curing of the UV-curable material in the dispenser, followed by 19 dispensing an amount of at least partially-cured material from the dispenser.

According to a further aspect, FIG. 2 shows a method 20 for dispensing UV-curable material from a dispenser, such as that shown in FIG. 4 and elsewhere herein, comprising the steps of 12 initiating UV light from a UV light source with the light source positioned within a dispenser, followed by 14 emitting UV light from the UV light source within the dispenser, and 16 substantially containing the UV light within the dispenser. The method further comprises 27 exerting a force (e.g., mechanical, pneumatic or other suitable force) on the UV-curable material in the dispenser, 28 directing a flow of UV-curable material through a nozzle pathway of a nozzle in the dispenser at a predetermined UV-curable material flow rate, 18 initiating curing of the UV-curable material in the dispenser, followed by 19 dispensing an amount of at least partially-cured material from the dispenser.

According to another aspect, FIG. 3 shows a method 30 for dispensing UV-curable sealant from a dispenser such as that shown in FIG. 4 and elsewhere herein to a substrate comprising the steps of 12 initiating UV light from a UV light source with the light source positioned within a dispenser, followed by 14 emitting UV light from the UV light source within the dispenser, and 16 substantially containing the UV light within the dispenser. The method further comprises 32 directing a flow of UV-curable sealant material through a nozzle pathway of a nozzle in the dispenser and 34 initiating curing of the UV-curable sealant material in the dispenser, followed by 36 dispensing an amount of at least partially-cured sealant material from the dispenser, and 38 applying the at least partially-cured sealant material onto a substrate surface.

Further aspects contemplate the use of the disclosed dispensers for applying sealants to components, parts, assemblies of larger structures, including stationary structures such as, for example, buildings, bridges, etc.

In addition, aspects of the present disclosure contemplate the use of the dispensers of the present disclosure for applying sealants to components, parts, and assemblies for vehicles including, without limitation, spars, ribs, stringers, skins, fuel tanks, etc.), and vehicles comprising a seal, with the sealant material comprising a light-cured sealant dispensed from a dispenser of the type disclosed herein.

Contemplated vehicles include, without limitation, manned aircraft, an unmanned aircraft, a manned spacecraft, an unmanned spacecraft, a manned rotorcraft, an unmanned rotorcraft, a satellite, a rocket, a missile, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A dispenser comprising:
   a housing;
   a reservoir contained within the housing, the reservoir dimensioned to contain a predetermined amount of light-curable material;
   a nozzle in communication with the reservoir, the nozzle comprising an inner nozzle wall, an outer nozzle wall, a proximate nozzle end and a distal nozzle end, the proximate nozzle end in communication with the reservoir, and the inner nozzle wall defining a nozzle pathway, the nozzle pathway comprising a static mixing section, the static mixing section comprising static mixing elements; and
   a light source configured to emit light, the light source positioned within the housing, the light source further positioned proximate to a portion of the outer nozzle wall within the housing and a predetermined distance from the distal nozzle end; and
   wherein the housing further comprises a distal housing end, the distal housing end comprising a gasket through which the distal nozzle end protrudes.

2. The dispenser of claim 1, wherein the housing is opaque to light and the nozzle wall comprises a material comprising a light transmission value ranging from about 80% to about 99%.

3. The dispenser of claim 1, wherein the light source is a UV light source and the light-curable material is a UV-curable material.

4. The dispenser of claim 1, wherein the light-curable material comprises at least one of: a polysulfide, a polythioether, a polyurethane, an epoxy, an acrylate, and a polyimide.

5. The dispenser of claim 1, wherein the light-curable material is a sealant.

6. The dispenser of claim 1, wherein the nozzle is integral with the reservoir.

7. The dispenser of claim 1, wherein the static mixing section comprises a removable insert.

8. The dispenser of claim 1, wherein the nozzle comprises a cartridge pre-loaded with the light-curable material.

9. The dispenser of claim 8, wherein the cartridge is removable from the dispenser.

10. A method for dispensing an at least partially-cured material from a dispenser comprising:
    initiating a light source, the light source housed within the dispenser, said dispenser comprising:
    a housing;
    a reservoir contained within the housing, the reservoir dimensioned to contain a predetermined amount of light-curable material;
    a nozzle in communication with the reservoir, the nozzle comprising an inner nozzle wall, an outer nozzle wall, a proximate nozzle end and a distal nozzle end, the proximate nozzle end in communication with the reservoir, and the inner nozzle wall defining a nozzle pathway, the nozzle pathway comprising a static mixing section, the static mixing section comprising static mixing elements; and
    a light source configured to emit light, the light source positioned within the housing, the light source further positioned proximate to a portion of the outer nozzle wall within the housing and a predetermined distance from the distal nozzle end; and
    wherein the housing further comprises a distal housing end, the distal housing end comprising a gasket through which the distal nozzle end protrudes;
    wherein light from the light source is substantially contained within the dispenser;
    directing a flow of the light-curable material through the nozzle pathway wherein the light-curable material is exposed to the light to form an at least partially-cured material; and
    dispensing the at least partially-cured material from the dispenser.

11. The method of claim 10, further comprising the step of: mixing the at least partially-cured material at the static mixing section.

12. The method of claim 10, further comprising the step of:
    dispensing the at least partially-cured material onto a substrate.

13. The method of claim 10, wherein, in the step of emitting light from the light source, the light is emitted at a wavelength ranging from about 280 nm to about 700 nm.

14. The method of claim 10, wherein, in the step of directing a flow of the light curable material through the nozzle pathway, the light curable material comprises a flow rate ranging from about 5 grams/minute. to about 200 grams/minute.

15. The method of claim 10, wherein, in the step of directing a flow of the light-curable material through the nozzle pathway, the light curable material comprises a light-curable sealant.

16. The method of claim 10, wherein, in the step of directing a flow of light-curable material through the nozzle, the step further comprises:
    exerting a force on the light-curable material in the dispenser; and
    directing the flow of the light-curable material through the nozzle pathway at a predetermined light-curable material flow rate, the light-curable material flow rate ranging from about 5 grams/minute to about 200 grams/minute.

17. The method of claim 10, wherein, in the step of directing a flow of the light-curable material through the nozzle pathway, the light-curable material comprises at least one of: a polysulfide, a polythioether, a polyurethane an epoxy, an acrylate or a polyimide.

18. The method of claim 10, wherein in the step of directing a flow of the light-curable material through the nozzle pathway, the light-curable material resides in the nozzle pathway for a predetermined dwell period.

19. The method of claim 10, wherein, in the step of dispensing the at least partially-cured material from the distal nozzle end, the at least partially-cured material is an aircraft sealant.

20. The method of claim 10, wherein the nozzle further comprises a cartridge pre-loaded with the light-curable material.

\* \* \* \* \*